(12) United States Patent
Muellerschoen (10) Patent No.: US 11,848,632 B2
(45) Date of Patent: Dec. 19, 2023

(54) LINEAR MOTOR SYSTEM AND METHOD FOR OPERATING

(71) Applicant: Schneider Electric Industries SAS, Rueil-Malmaison (FR)

(72) Inventor: Volker Muellerschoen, Hoechberg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 36 days.

(21) Appl. No.: 17/446,183

(22) Filed: Aug. 27, 2021

(65) Prior Publication Data
US 2022/0069754 A1   Mar. 3, 2022

(30) Foreign Application Priority Data

Aug. 28, 2020   (EP) .................................... 20305960

(51) Int. Cl.
*H02P 25/062*   (2016.01)
*H02K 41/03*   (2006.01)

(52) U.S. Cl.
CPC ......... *H02P 25/062* (2016.02); *H02K 41/031* (2013.01)

(58) Field of Classification Search
CPC ........ B65G 17/12; B65G 19/00; B65G 47/74; B65G 54/02; H02K 41/00; H02K 1/00; H02K 3/00; B60M 7/00
See application file for complete search history.

(56) References Cited

U.S. PATENT DOCUMENTS

| | | |
|---|---|---|
| 5,293,308 A | 3/1994 | Boys et al. |
| 2016/0114988 A1 | 4/2016 | Unterseher |
| 2019/0055091 A1 | 2/2019 | Achterberg et al. |

(Continued)

FOREIGN PATENT DOCUMENTS

| | | |
|---|---|---|
| CN | 111130299 A | 5/2020 |
| DE | 42 36 340 A1 | 5/1994 |
| DE | 692 27 242 T3 | 7/2005 |

(Continued)

OTHER PUBLICATIONS

European Search Report dated Feb. 16, 2021 in European Patent Application No. 20305960.5 (with English translation of categories of cited documents), 9 pages.

*Primary Examiner* — Said Bouziane
(74) *Attorney, Agent, or Firm* — Oblon, McClelland, Maier & Neustadt, L.L.P.

(57) ABSTRACT

A linear motor system, which is in particular a transport system and, for example, a multi-carrier, comprises a guide track having a plurality of electromagnets arranged distributed along the guide track; at least one carrier that is guided by and movable along the guide track and that comprises a drive magnet for cooperating with the electromagnets of the guide track to move the carrier; and a control device for controlling the movement of the carrier relative to the guide track by a corresponding control of the electromagnets. The guide track has at least one stationary transmission device that is provided for supplying energy and that is located at a predetermined position. The carrier comprises a corresponding reception device, which is configured to receive energy from the transmission device of the guide track, and an energy consumer.

15 Claims, 5 Drawing Sheets

(56) References Cited

U.S. PATENT DOCUMENTS

2020/0044593 A1* 2/2020 Sun .................. H02P 25/064

FOREIGN PATENT DOCUMENTS

| | | |
|---|---|---|
| DE | 10 2015 103 590 A1 | 9/2016 |
| DE | 10 2017 221 207 A1 | 5/2019 |
| DE | 10 2018 218 666 A1 | 4/2020 |
| EP | 2 599 186 B1 | 9/2016 |
| EP | 1 634 366 B1 | 5/2017 |
| EP | 1 673 846 B1 | 4/2018 |
| EP | 3 462 573 A2 | 4/2019 |
| EP | 3 462 573 A2 | 6/2019 |
| WO | WO 2005/021317 A1 | 3/2005 |
| WO | WO 2005/091476 A1 | 9/2005 |
| WO | WO 2016/008663 A1 | 1/2016 |
| WO | WO 2019/007923 A1 | 1/2019 |

* cited by examiner

LINEAR MOTOR SYSTEM AND METHOD FOR OPERATING

The invention relates to a linear motor system and to a method of operating the same. The linear motor system has at least one carrier and a guide track having a plurality of electromagnets that are arranged distributed along the guide track and that cooperate with a drive magnet of the carrier to move the carrier along the guide track.

Linear motor systems are widely used today. They can, for example, be used to move products in industrial plants, in particular to transport them. Multi-carrier systems are particularly advantageous for the flexible transport of the most varied products. They comprise a plurality of carriers, i.e. transport units, that can be moved individually and independently of one another. In a typical multi-carrier system, a guide track for the carriers is closed in itself, which enables a revolving operation.

When linear motor systems are used, it is often not only necessary to move a product along a guide track of the linear motor system, but also to act on the product along the guide track. For example, it may be necessary to rotate the product along the guide track during the transport. In another application of a linear motor system, it may be necessary to first produce a container or a package, for instance by folding a cardboard box, to fill the container or the package with a product during the further transport along the guide track, and subsequently to reseal the container or package.

In known linear motor systems, passive carriers or transport units are usually present that per se do not permit any action on the products to be transported.

Instead, external devices are often provided that are arranged at specific positions along the guide track and that interact with the product during the transport along the guide track.

However, such external devices require an additional space along and next to the guide track and they therefore increase the need for installation space as well as the costs of the total plant within which the linear motor system is located. Furthermore, such external devices are usually not flexibly changeable.

An object of the invention comprises providing a linear motor system and a method of operating the same in which the possibility exists or is provided to act on an object to be transported at a carrier of the linear motor system itself without the need for an external device.

This object is satisfied by the subjects of the independent claims.

A linear motor system, which is in particular configured as a transport system and, for example, as a multi-carrier system, comprises a guide track having a plurality of electromagnets arranged distributed along the guide track; and at least one carrier that is guided by and movable along the guide track and that comprises a drive magnet for cooperating with the electromagnets of the guide track to move the carrier. The linear motor system further comprises a control device for controlling the movement of the carrier relative to the guide track in that the electromagnets of the guide track are correspondingly controlled.

The carrier further has an energy consumer, whereas the guide track has at least one stationary transmission device that is provided for supplying energy and that is located at a predetermined position along the guide track. The carrier accordingly has a reception device that is configured to receive energy from the transmission device of the guide track. The carrier additionally has an energy storage device that is in communication with the reception device and with the energy consumer. The energy storage device of the carrier is configured to supply the energy consumer with energy during its operation.

The energy consumer of the carrier is, for example, an actuator, which e.g. mechanically acts on a product that is transported by means of the carrier, and/or a sensor that is capable of detecting specific properties of the product. The energy consumer is thus designed for a minimum power consumption that is, for example, required for the mechanical action on a product. The power consumption of the energy consumer can, for example, have a lower limit of 10, 30, 50, or 100 watts, and the storage device for energy is accordingly designed such that a reliable operation of the actuator and/or of the sensor as an energy consumer is ensured. Accordingly, at least a power of more than 10, 30, 50, or 100 watts can be transmitted to the carrier by means of the transmission device.

Since the carrier is equipped with the reception device and with the storage device for energy, the carrier can per se provide a suitable energy amount so that the energy consumer can, for example, act on the product in the form of an actuator and/or sensor. Complex external devices for acting on the product are thus no longer necessary. Therefore, a plant within which the linear motor system is located requires a reduced base surface compared to plants that require external devices for acting on the product. As a result, the costs for the total plant are reduced.

Furthermore, the position at which the transmission device of the guide track for providing the energy for the carrier is located is not defined in advance such that the transmission device can be flexibly arranged along the guide track. In this respect, in a direction along the guide track, the transmission device can either at most extend over the length of the carrier in the direction of the guide track if the energy transmission takes place when the carrier is stationary or the transmission device can extend over some few lengths of the carrier, for example three to five carrier lengths, if the carrier is in motion during the energy transmission. In both cases, the length over which the transmission device extends along the guide track is considerably less than the total length of the guide track, however. This permits a flexible design of the linear motor system and of the corresponding plant as a whole. Due to the energy storage device of the carrier, the transmission of the energy from the guide track to the carrier is also independent in time of the use of the energy by the energy consumer. Furthermore, the time duration for the transmission of the energy and the size of the energy storage device can be dimensioned such that a sufficient energy amount is available for the activity of the energy consumer.

The drive magnet can also comprise a plurality of individual magnets, in particular permanent magnets.

The guide track can be formed by a plurality of linear motors (i.e. segments). Each linear motor preferably comprises a plurality of the electromagnets by means of which the carriers are moved.

Advantageous further developments of the invention are set forth in the dependent claims, in the description, and in the drawings.

In accordance with an embodiment, the reception device is configured to contactlessly receive the energy from the transmission device. The transmission of the energy to the carrier of the linear motor system is thereby free of wear that would, for example, occur on a mechanical energy transmission with a direct coupling or on an electrical energy transmission by means of slip rings and could in this respect produce dust and dirt. The contactless energy transmission is particularly advantageous when the linear motor system is to be used in an aseptic environment.

The energy storage device of the carrier may further be configured to store electric charge. In this case, double-layer capacitors such as supercaps or ultracaps and, alternatively, accumulators such as lithium-ion batteries can, for example, be used as energy storage devices. Such storage devices for electric charge advantageously have a high energy density, whereby the performance capability and application possibilities for the energy consumer are improved.

The carrier can further comprise an electronic device that is provided for controlling the energy consumer and for determining a charge state of the energy storage device. The activation of the energy consumer and the charging of the energy storage device can thus be coordinated with the movement of the carrier along the guide track by means of the electronic device. For example, the movement of the carrier can be controlled such that the carrier comes into contact with the stationary transmission device as soon as the charge state of the energy storage device falls below a predetermined threshold value in order to recharge the energy storage device in good time. It can thereby be ensured that the energy storage device always contains sufficient energy to activate the energy consumer.

The transmission device of the guide track and the reception device of the carrier can each have at least one coil. In this respect, the coil of the transmission device can be inductively coupled to the coil of the reception device when the reception device is located within a predetermined spacing with respect to the transmission device. The at least one coil of the transmission device can comprise a plurality of overlapping coils or an elongated coil along the guide track. Furthermore, an inductive resonant coupling, in which the respective coils are tuned to the same frequency, is in particular provided between the transmission device of the guide track and the reception device of the carrier. The energy transmission to the carrier can be achieved in a relatively simple and space-saving manner by means of the inductive coupling of two coils and in particular their inductive resonant coupling.

Alternatively or additionally, the energy transmission can also take place capacitively. For this purpose, the transmission device and the reception device can jointly comprise a capacitor and can, for example, each have a plate of a plate capacitor.

The predetermined position of the transmission device can further be different from positions along the guide track at which an activation of the energy consumer is provided. The energy transmission to the carrier is thus independent in time and in space of the activation of the energy consumer. For example, a plurality of process stations can be provided along the guide track, at which process stations an actuator and/or a sensor of the carrier is/are respectively activated in a different manner in order to perform specific steps in a predetermined order, said steps, for example, being associated with a manufacturing process. The temporal and spatial decoupling of the energy transmission from the activation of the energy consumer further enables a flexible arrangement of one or more stationary transmission devices along the guide track, for example between the respective process stations.

In accordance with a further embodiment, the carrier is configured to wirelessly transmit and receive information. This information in particular relates to the control of the energy consumer and/or to a charge state of the energy storage device. The carrier can thus be coupled in a technical signal manner to the control device of the linear motor system such that the movement of the carrier can be coordinated with its internal control, i.e., for example, with the activation of the energy consumer and the detection of the charge state of the energy storage device.

The reception device of the carrier and the transmission device of the guide track can in this respect additionally be configured to transmit and receive the information. Thus, the reception device and the transmission device can have a dual functionality, and indeed for the energy transmission and for the communication between the carrier and, for example, the control device of the linear motor system. In this embodiment, no further devices are consequently required for the communication, wherein the communication between the reception device of the carrier and the transmission device of the guide track can be limited to the region of the stationary position of the transmission device.

Alternatively, the carrier can have a separate communication device that is in direct wireless contact with the control device of the linear motor system. Known, inexpensive wireless technology can in this respect be used, for example Bluetooth, WiFi, etc. In this alternative, the communication between the carrier and, for example, the control device of the linear motor system is not limited to a specific spatial region, but can take place along the total guide track of the linear motor system.

In accordance with a further embodiment, the carrier can be configured (or correspondingly controlled or moved by the electromagnets of the guide track) to stop for a respective predetermined time duration i) for an energy transmission at the position of the transmission device and/or ii) at a predetermined activation position of the energy consumer. Alternatively, the carrier can, however, also be in motion during the energy transmission and/or during an activation of the energy consumer. During the energy transmission, the speed of the carrier is, however, preferably low in this respect (i.e. below a threshold speed that is below a typical movement speed of the carrier) such that the carrier passes very slowly through the transmission device for the energy transmission.

When the carrier stops for the energy transmission, the predetermined time duration can variably depend on the charge state of the energy storage device when the charge state of the energy storage device is detected. By means of the respective predetermined time durations for the respective stopping of the carrier or by means of the speed during the energy transmission or the activation of the energy consumer when the carrier remains in motion during this time, the energy transmission to the carrier and the activation of the energy consumer can thus be coordinated with one another.

It is a further subject of the invention to provide a method of operating a linear motor system such as is described above, for example. In addition to a carrier, the linear motor system has a guide track having a plurality of electromagnets that are arranged distributed along the guide track and that cooperate with a drive magnet of the carrier to move the carrier along the guide track. The carrier is equipped with an energy consumer and an energy storage device for the energy supply of the energy consumer. At least one process station, at which the energy consumer of the carrier is activated, and at least one transmission device for transmitting energy to the carrier are furthermore provided along the guide track.

The method comprises a calibration phase and an operating phase of the linear motor system. An energy amount that is required for an activation of the energy consumer at the process station is determined during the calibration phase. In the operating phase, in contrast, the energy amount determined during the calibration phase is transmitted to the carrier by means of the transmission device before the energy consumer of the carrier is activated at the process station.

Thus, the method as a whole serves for the transmission of energy to the carrier. The transmission of the energy to the carrier by means of the transmission device is coordinated with the activation of the energy consumer at the process station with respect to the energy amount required. In this respect, the energy amount required that is determined during the calibration phase can be greater than the energy amount actually consumed by the energy consumer during its activation in order to ensure the activation of the energy consumer. In other words, the energy amount required comprises a safety reserve.

Due to the coordination of the energy transmission with the activation of the energy consumer, the process sequence along the guide track can be optimized since, on the one hand, a sufficient energy amount is provided for the activation of the energy consumer at the process station and, on the other hand, no unnecessarily large energy amount is transmitted that would correspondingly require an unnecessarily long time duration for the energy transmission.

In accordance with an embodiment of the method, the energy storage device of the carrier is configured to store electric charge and, in accordance with the method, a first charge state of the energy storage device is first determined before the energy consumer of the carrier is activated at the process station. After the activation of the energy consumer at the process station, a second charge state of the energy storage device is further determined and the energy amount that is required for activating the energy consumer is subsequently determined based on a difference of the first charge state and the second charge state of the energy storage device.

If the energy storage device is, for example, formed by means of capacitors, the charge state can be determined by a simple voltage measurement. The present embodiment with a determination of two charge states thus permits a simple and inexpensive execution of the method.

In accordance with a further embodiment of the method, a third charge state of the energy storage device can additionally be determined in the operating phase of the linear motor system before the energy consumer is activated at the process station and a fourth charge state of the energy storage device is determined after the activation of the energy consumer at the process station. A correction energy amount for activating the energy consumer can further be determined based on a difference of the third charge state and the fourth charge state and a deviation can be determined between this correction energy amount and the energy amount determined in the calibration phase. The energy amount determined in the calibration phase can be updated with the correction energy amount when the deviation exceeds a predetermined threshold value.

During the operating phase of the linear motor system, an update of the required energy amount for activating the energy consumer can thus take place based on the difference of two charge states before and after the activation. Furthermore, the energy amount required that is determined during the calibration phase can be checked during the operating phase. During the operating phase, the additional method steps furthermore permit an adaptation of the linear motor system to a change of parameters of the energy consumer and/or to a change of a product on which the energy consumer is to act and which is transported by means of the linear motor system.

The invention will be described in the following by way of example with reference to an advantageous embodiment and to the enclosed Figures. There are shown, schematically in each case.

Figure 1:
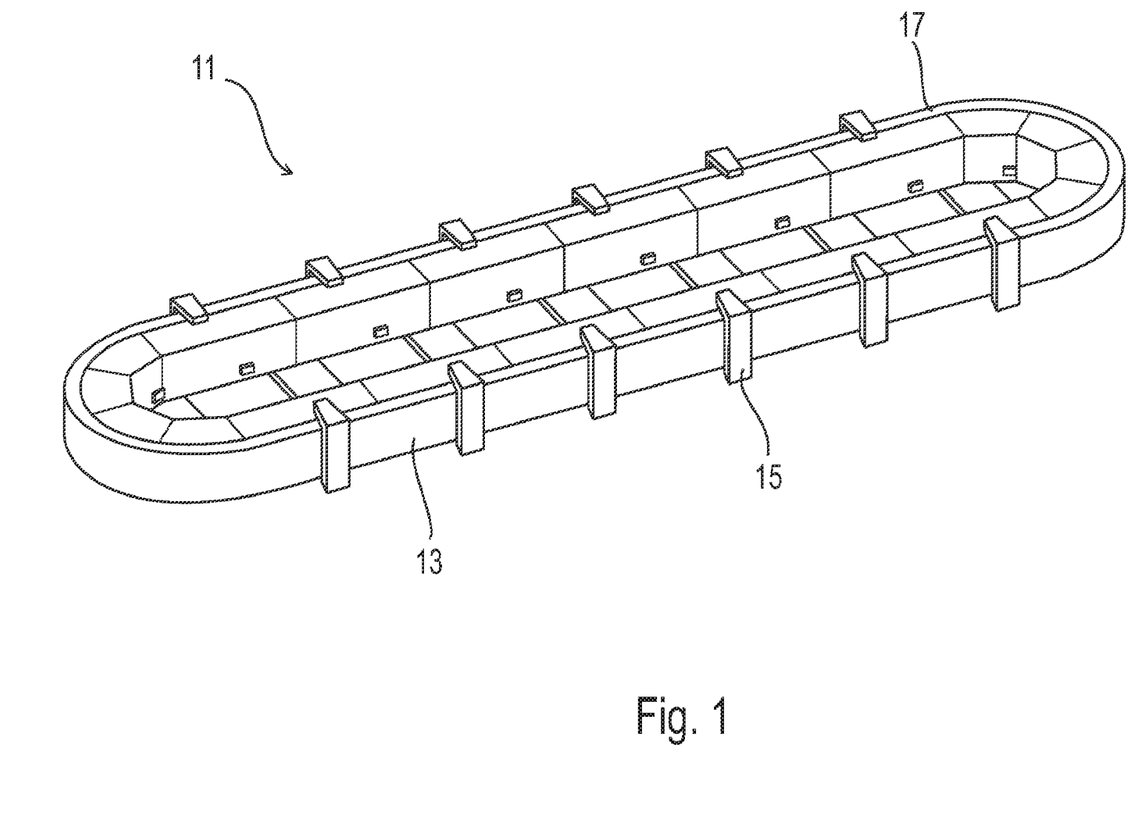
FIG. 1 a linear motor system configured as a transport system.

A linear motor system 11, which is configured as a multi-carrier system, is shown in FIG. 1. The linear motor system 11 comprises a plurality of linear motors 13 that are arranged in a row such that a continuous and in this case revolving movement of the carriers 15 along a guide track 17 is made possible. The transport system 11 further comprises a plurality of carriers 15 that form individual transport elements of the transport system 11 and that can be moved independently of one another along the guide track 17 by means of the linear motors 13.

Figure 2:
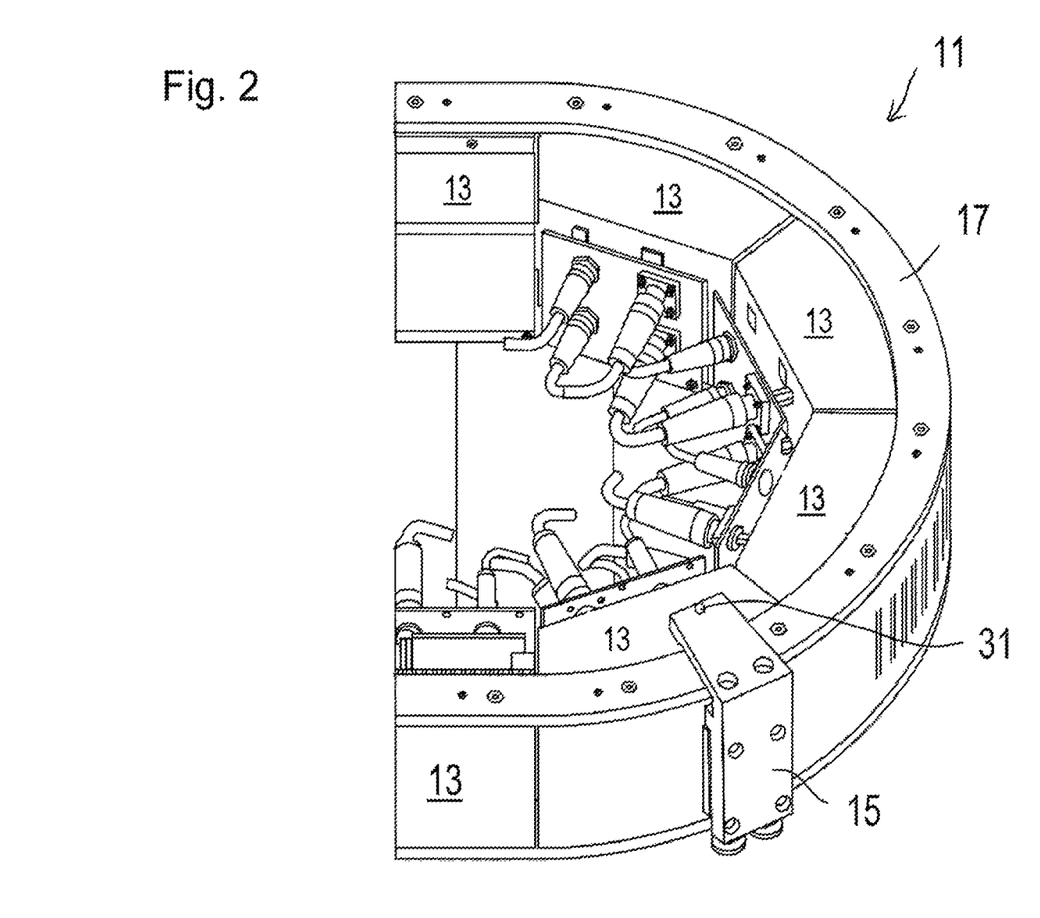
FIG. 2 a curve section of the linear motor system of FIG. 1.

FIG. 2 shows a curve section of the linear motor system 11 in an enlarged view. Only one carrier 15 is shown here that is movable along the guide track 17 by means of the linear motors 13. Different electronic devices for controlling the linear motors 13 are visible at the side of the guide track 17 remote from the carrier 15, i.e. within the curve section.

Figure 3:
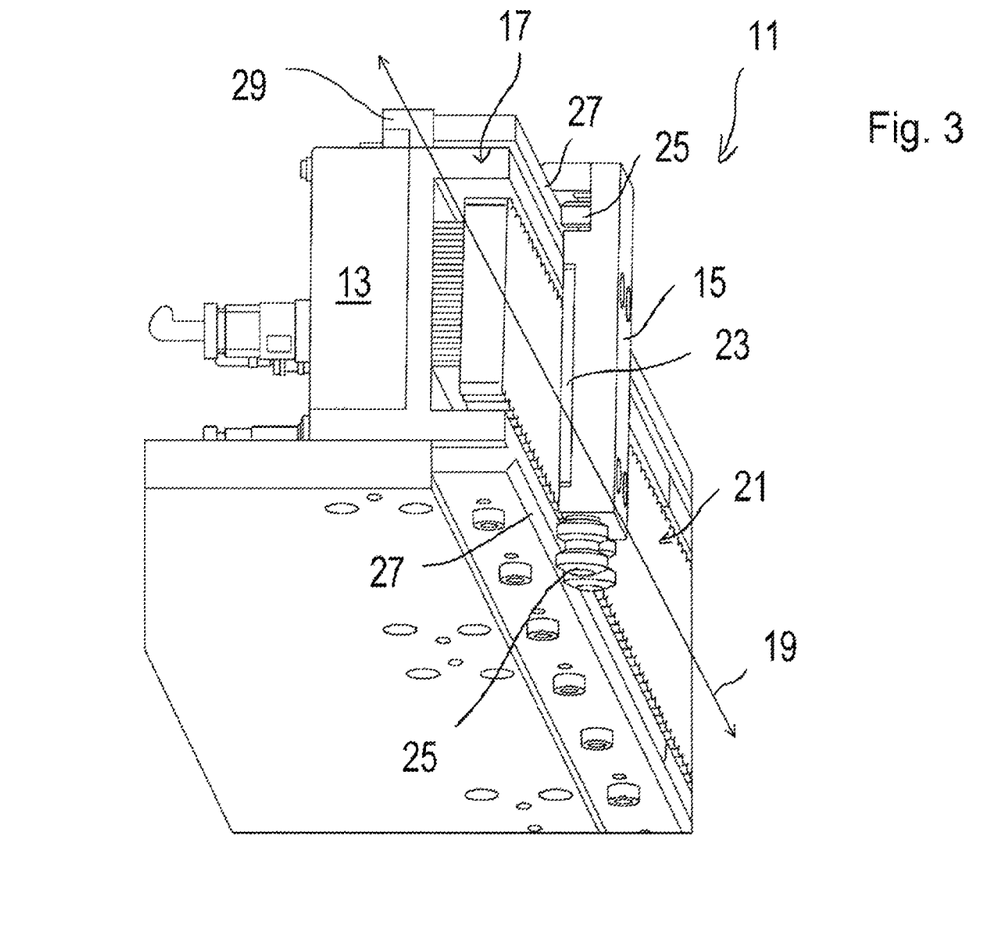
FIG. 3 a perspective sectional view of the linear motor system of FIG. 1 with a sectional plane perpendicular to the guide track.

In FIG. 3, the linear motor system 11 is shown in a sectional view and enlarged. A carrier 15 is visible that is movably guided at the guide track 17. In this respect, the carrier 15 is movable along a guide axis 19 or a movement axis. For a movement along the guide axis 19, the carrier 15 is controlled by a plurality of electromagnets 21 that are arranged at and uniformly distributed along the guide track 17. The electromagnets 21 in this respect cooperate with a permanent magnet 23, which is arranged at the carrier 15 and which can also be designated as a drive magnet, to drive the carrier.

The carrier 15 is mechanically guided at the guide track 17, and indeed by a roller guide. Said roller guide comprises guide rollers 25 at the carrier 15 and guide rails 27 at the guide track 17. The carrier 15 is in this respect held at the guide track 17, in particular via the permanent magnet 23.

The linear motor system 11 furthermore comprises a position detection device 29. Said position detection device can, for example, be formed as a series of a plurality of magnetic sensors that extends along the guide track 17. For example, a permanent magnet 31, which can also be designated as a position magnet and is visible in FIG. 2, can be provided at the carrier 15.

Figure 5:
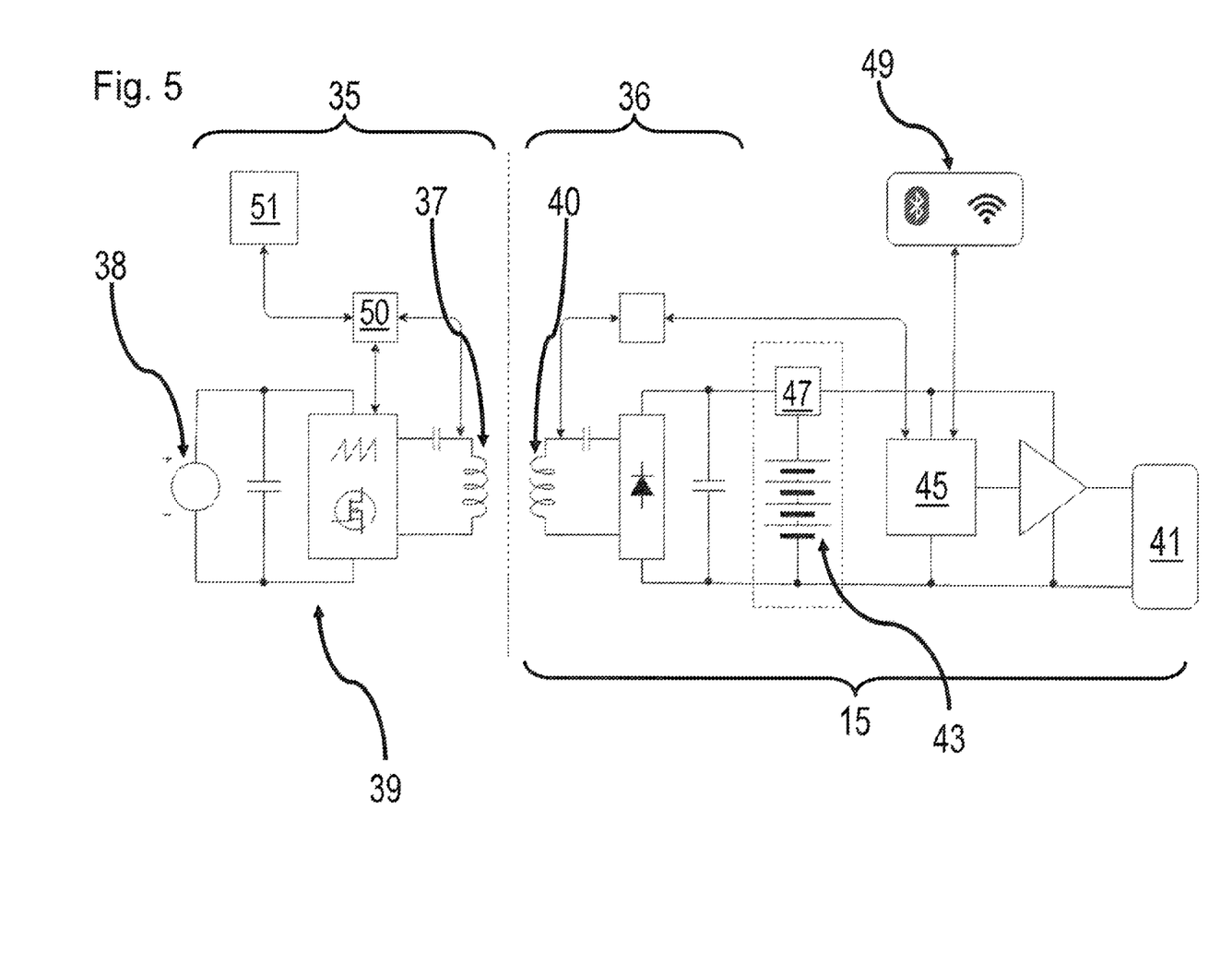
FIG. 5 a detailed view of a device for transmitting energy to a carrier of the linear motor system of FIG. 4.

The linear motor system 11 furthermore comprises a communication interface 50 (see FIG. 5) that is coupled to a control device 51 of which an element is shown in FIG. 5 and which is configured to control the electromagnets 21 in a targeted manner to move the carrier 15 along the guide track 17 or the guide axis 19. In this respect, the position detection device 29 returns position information relating to the position of the carrier 15 with respect to the guide axis 19 to the control device 51. The control device 51 regulates the movement of the carrier 15 on the basis of the position information.

Figure 4:
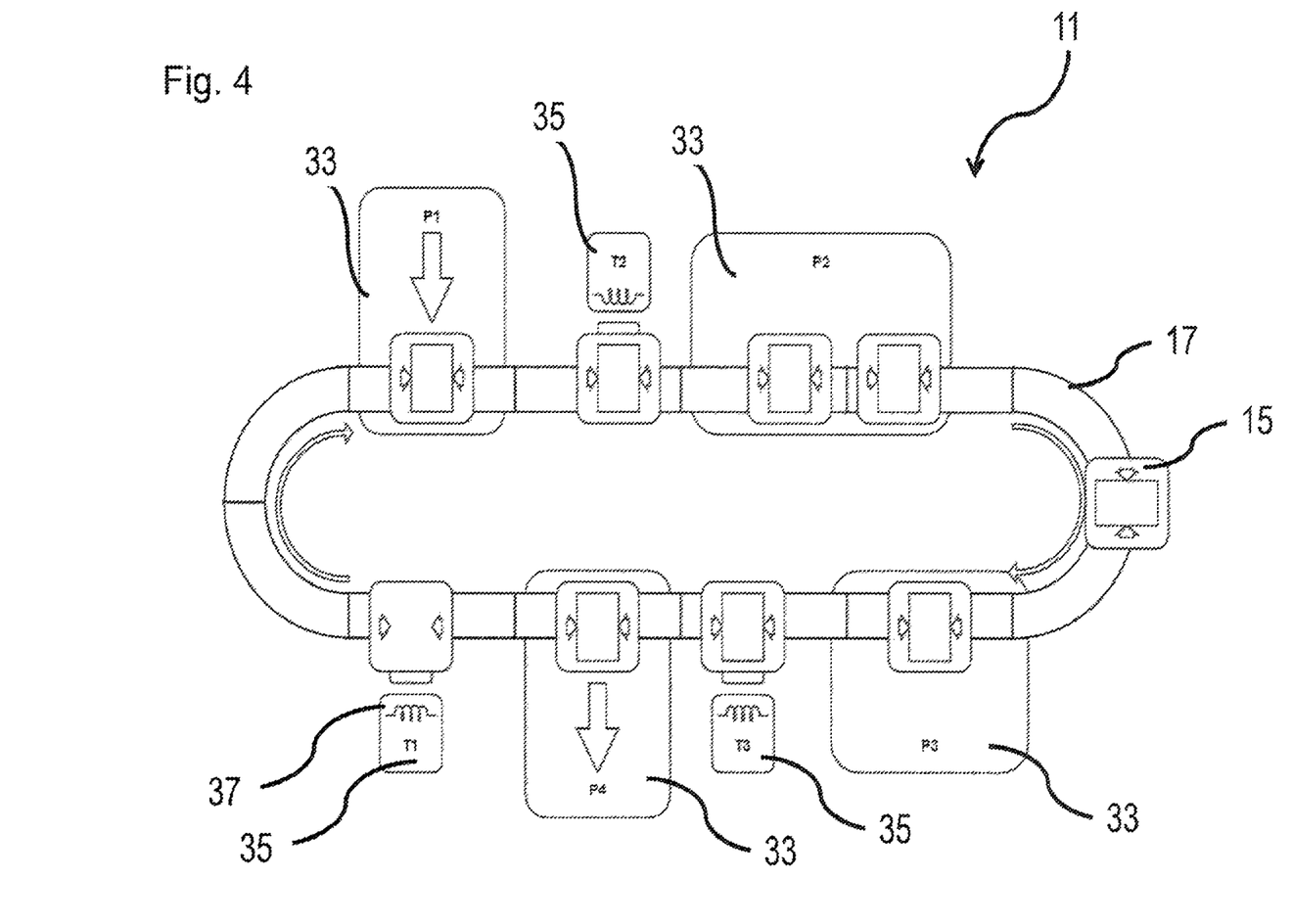
FIG. 4 a representation of a linear motor system with a transmission device and a reception device.

FIG. 4 shows a schematic representation of a linear motor system 11 in accordance with the invention that, just like the linear motor system 11 of FIGS. 1 to 3, is configured as a multi-carrier system and comprises all the elements that are shown in FIGS. 1 to 3 and that are described above. Thus, the linear motor system 11 has a plurality of carriers 15 that move clockwise along the closed guide track 17, as indicated by the arrows.

A total of four process stations 33 (cf. FIG. 4), which are successively run through by the carriers 15 and are designated by P1, P2, P3, and P4, are arranged along the guide track 17. At the first process station 33 or P1, material for manufacturing a container is fed to the carrier 15 and the container is subsequently manufactured by means of an actuator 41 (cf. FIG. 5) of the carrier 15, for example by folding a cardboard box. At the second process station 33 or P2, the container is filled with a product, whereas the container is closed at the third process station 33 or P3 and exits the linear motor system 11 at the fourth process station 33 or P4.

A total of three transmission devices 35 are arranged along the guide track 17 between the process stations 33 and are provided for transmitting energy to the carrier 15. In the present embodiment example, a respective transmission device 35 is located between the first and second process station 33 or between P1 and P2, between the third and fourth process station 33 or between P3 and P4, and between the fourth and first process station 33 or between P4 and P1. To transmit energy to the carrier, the transmission devices 35 each comprise at least one coil 37 to provide an inductive coupling between the transmission device 35 and the carrier 15, as explained in more detail in the following.

It is understood that almost any desired constellations of segments comprising linear motors 13, carriers 15, process stations 33, and transmission devices 35 can be implemented by such a linear motor system 11.

FIG. 5 shows a detailed view of a section of the linear motor system 11 of FIG. 4 in which a carrier 15 is located in direct proximity to one of the transmission devices 35. The transmission device 35 has the coil 37 that is already shown in FIG. 4 and that ultimately serves to transmit energy to the carrier 15. The transmission device 35 further has a power or current source 38 that is in communication with an oscillator 39 that in turn supplies the coil 37 with an AC voltage. Furthermore, an element of the control device 51 is shown in FIG. 5 that is generally provided for controlling the movement of the carrier 15 along the guide track 17 and whose element shown here controls the transmission of energy to the carrier 15 by means of the coil 37.

The carrier 15, just like the transmission device 35, has a coil 40 that belongs to a reception device 36 of the carrier 15. By means of the reception device 36, the carrier 15 is capable of receiving energy from the transmission device 35 via the coil 40. For this purpose, the coil 40 is in a resonant coupling with the coil 37 of the transmission device 35, in which resonant coupling the two coils 37, 40 are tuned to the same frequency. In practice, a high coupling factor of approximately 0.5 to 0.8, e.g. 0.54, can be achieved at a spacing of 3 to 6 mm between the coils 37, 40. The energy that is absorbed by the coil 40 of the carrier 15 ultimately serves to supply an energy consumer 41 that is configured as an actuator in the present example. In the operation of the linear motor system 11, the actuator 41 acts on one or more objects at the process stations 33 (cf. FIG. 4), said objects being transported along the guide track 17 of the linear motor system 11 by means of the carrier 15.

The energy that is absorbed by the coil 40 and that is to be consumed by the actuator 41 at the process stations 33 (cf. FIG. 4) is stored in the carrier 15 in an energy storage device 43. The energy storage device 43 comprises double-layer capacitors, such as supercaps or ultracaps, that have a high energy density and that are charged by means of the coil 40 when the carrier 15 is in the proximity of the transmission device 35.

The carrier 15 further has an electronic device 45 in the form of a processor that, on the one hand, serves to control the actuator 41. Furthermore, the processor 45 is in communication with a device 47 for detecting the charge state of the energy storage device 43.

The carrier 15 additionally has a communication device 49 by which the carrier 15 is in a communication link with the control device 51 of the linear motor system 11, for example, by means of Bluetooth, WiFi, etc. Via this communication link, it is possible to control the actuator 41 by means of the control device of the linear motor system 11 at any desired position of the carrier 15 along the guide track 17. Furthermore, the inductive coupling between the two coils 37, 40 can additionally be used to transmit information, for example, to transmit the charge state of the energy storage device 43 while it is charged at the transmission device 35.

During the operation of the linear motor system 11, a respective carrier 15 can in each case stop for a predetermined time duration at one of the transmission stations 35 (cf. FIG. 4) until the energy storage device 43 of this carrier 15 has reached a predetermined charge state. Alternatively, it is, however, also possible that a respective carrier 15 passes through the region of the respective transmission station 35 at a low speed while the energy storage device 43 is charged. In this case, it is expedient that the coil 37 of the transmission device 35 is elongate along the guide track 17 or comprises a plurality of superimposed coils.

To determine the energy amount that a respective actuator 41 of a carrier 15 requires at a respective process station 33 (cf. FIG. 4), a calibration phase of the linear motor system 11 is provided before its actual operating phase. During the calibration phase, a first charge state of the energy storage device 43 of one of the carriers 15 is first detected before the carrier 15 reaches the respective process station 33 or P1, P2, P3, or P4. After the activation of the actuator 41 at the respective process station 33, a second charge state of the energy storage device 43 is detected. The energy amount that is required for the activation or actuation of the actuator 41 at the respective process station 33 is determined based on the difference of the first and second charge states. In the subsequent operating phase of the linear motor system 11, the energy storage device 43 of the carrier 15 is charged at one of the transmission devices 35 in front of the respective process station 33 with a charge that corresponds to the energy amount that was previously determined during the calibration phase for this process station 33.

Furthermore, the energy amount that is determined for the respective process station 33 during the calibration phase can be checked or adapted during the operating phase of the linear motor system 11. For this purpose, a pair of charge states of the energy storage device 43 of the respective carrier 15 is again determined, and indeed again in each case before and after the activation or actuation of the actuator 41 at the respective process station 33. The difference of these two charge states is compared with the difference of the corresponding charge states from the calibration phase in order, if necessary, to adapt the energy amount that the energy storage device 43 of the carrier 15 is to absorb at the respective transmission devices 35. It is thereby possible to adapt the energy amount required for the actuation of the actuator 41 and the corresponding charge to be absorbed when the actuation of the actuator 41 at a respective process station 33 is changed or the kind of products is changed which are transported by means of the linear motor system 11 and on which the actuator 41 is to act.

REFERENCE NUMERAL LIST 11 linear motor system
13 linear motor
15 carrier
17 guide track
19 guide axis
21 electromagnets
23 drive magnet
25 guide rollers
27 guide track
29 position detection device
31 position magnet
33 process station
35 transmission device
36 reception device
37 coil of the transmission device
38 power source
39 oscillator
40 coil of the carrier
41 energy consumer, actuator and/or sensor
43 energy storage device
45 electronic device, processor
47 device for detecting the charge state
49 communication device
50 communication interface
51 control device

The invention claimed is:

1. A linear motor system comprising:
 a guide track having a plurality of electromagnets arranged distributed along the guide track;
 at least one carrier that is guided by and movable along the guide track and that comprises a drive magnet for cooperating with the electromagnets of the guide track to move the carrier; and
 a control device for controlling the movement of the carrier relative to the guide track by a corresponding control of the electromagnets, wherein
 the carrier has an energy consumer, the guide track has at least one stationary transmission device that is provided for supplying energy and that is located at a predetermined position, the carrier has a reception device that is configured to receive energy from the transmission device of the guide track, and the carrier has an energy storage device that is connected to the reception device and to the energy consumer and that is configured to supply the energy consumer with energy during its operation, wherein
 the carrier is configured to wirelessly transmit and receive information that relates to the control of the energy consumer and/or to a charge state of the energy storage device.

2. The linear motor system in accordance with 1, wherein the reception device is configured to contactlessly receive the energy from the transmission device.

3. The linear motor system in accordance with claim 1, wherein the transmission device of the guide track and the reception device of the carrier each have at least one coil, and the at least one coil of the transmission device is inductively coupled to the at least one coil of the reception device when the reception device is located within a predetermined spacing with respect to the transmission device.

4. The linear motor system in accordance with claim 3, wherein an inductive resonant coupling, in which the respective coils are tuned to the same frequency, is provided between the transmission device of the guide track and the reception device of the carrier.

5. The linear motor system in accordance with claim 1, wherein the predetermined position of the transmission device is different from positions along the guide track at which an activation of the energy consumer is provided.

6. The linear motor system in accordance with claim 1, wherein the reception device of the carrier and the transmission device of the guide track are additionally configured to transmit and receive the information.

7. The linear motor system in accordance with claim 1, wherein the carrier further has an additional communication device that is in direct wireless contact with the control device of the linear motor system.

8. The linear motor system in accordance with claim 1, wherein the carrier is configured to stop for a respective predetermined time duration for an energy transmission at the position of the transmission device and/or at a predetermined activation position of the energy consumer.

9. The linear motor system in accordance with claim 1, wherein the carrier is in motion during the energy transmission and/or during an activation of the energy consumer.

10. The linear motor system in accordance with claim 1, wherein the information relates to at least one of the control of the energy consumer and to a charge state of the energy storage device.

11. The linear motor system in accordance with claim 1 wherein the linear motor system is a transport system.

12. The linear motor system in accordance with claim 11, wherein the transport system comprises a multi-carrier.

13. The linear motor system in accordance with claim 1, wherein the energy storage device of the carrier is configured to store electric charge, and the carrier further comprises an electronic device that is provided for controlling the energy consumer and for determining a charge state of the energy storage device.

14. A method of operating a linear motor system that has a carrier and a guide track having a plurality of electromagnets that are arranged distributed along the guide track and that cooperate with a drive magnet of the carrier to move the carrier along the guide track, wherein
 the carrier is equipped with an energy consumer and an energy storage device for the energy supply of the energy consumer, and at least one process station, at which the energy consumer of the carrier is activated, and at least one transmission device for transmitting energy to the carrier are provided along the guide track, the method comprising:
 determining an energy amount that is required for an activation of the energy consumer at the process station in a calibration phase of the linear motor system; and
 transmitting the energy amount determined in the calibration phase to the carrier by means of the transmission device in an operating phase of the linear motor system before the energy consumer of the carrier is activated at the process station,
 wherein the energy storage device of the carrier is configured to store electric charge, and wherein, in the calibration phase of the linear motor system, the method further comprises:

a first charge state of the energy storage device being determined before the energy consumer of the carrier is activated at the process station, a second charge state of the energy storage device being determined after the activation of the energy consumer at the process station, and the energy amount that is required for activating the energy consumer being determined based on a difference of the first charge state and the second charge state of the energy storage device.

15. The method in accordance with claim 14 wherein, in the operating phase of the linear motor system, the method further comprises: a third charge state of the energy storage device being determined before the energy consumer is activated at the process station, a fourth charge state of the energy storage device being determined after the activation of the energy consumer at the process station, a correction energy amount for activating the energy consumer being determined based on a difference of the third charge state and the fourth charge state of the energy storage device, a deviation between the energy amount determined in the calibration phase and the correction energy amount being determined, and the energy amount determined in the calibration phase being updated with the correction energy amount when the deviation exceeds a predetermined threshold value.

* * * * *